United States Patent
Littlefield et al.

(10) Patent No.: US 10,190,643 B2
(45) Date of Patent: Jan. 29, 2019

(54) SYNCHRONIZER FOR RADIALLY APPLIED DOG CLUTCH FOR A VEHICLE

(71) Applicant: GM GLOBAL TECHNOLOGY OPERATIONS LLC, Detroit, MI (US)

(72) Inventors: Joseph R Littlefield, Sterling Heights, MI (US); Jonathan Boyd, Royal Oak, MI (US)

(*) Notice: Subject to any disclaimer, the term of this patent is extended or adjusted under 35 U.S.C. 154(b) by 147 days.

(21) Appl. No.: 15/434,553

(22) Filed: Feb. 16, 2017

(65) Prior Publication Data

US 2018/0231068 A1    Aug. 16, 2018

(51) Int. Cl.
*F16D 23/06* (2006.01)
*F16D 11/16* (2006.01)

(52) U.S. Cl.
CPC .............. *F16D 23/06* (2013.01); *F16D 11/16* (2013.01)

(58) Field of Classification Search
CPC .................................. F16D 23/06; F16D 11/16
See application file for complete search history.

(56) References Cited

U.S. PATENT DOCUMENTS

| 9,151,339 B2* | 10/2015 | Lee .......................... F16D 21/00 |
| 9,644,690 B2* | 5/2017 | Lee .......................... F16D 43/00 |
| 10,036,429 B2* | 7/2018 | Ince ......................... F16D 13/10 |
| 2013/0281242 A1 | 10/2013 | Tolkacz et al. |
| 2015/0014113 A1* | 1/2015 | Ohr .......................... F16D 13/14 192/70.23 |
| 2015/0152922 A1* | 6/2015 | Lee .......................... F16D 13/14 192/66.1 |
| 2016/0084326 A1* | 3/2016 | Ramsey ................ F16D 41/063 192/45.1 |

* cited by examiner

*Primary Examiner* — David J Hlavka

(57) ABSTRACT

A radially applied dog clutch for a vehicle transmission. The clutch includes a driving member configured to rotate about an axis and including a cavity extending radially from the axis, a driving tooth slidably movable within the radially extending cavity, a driven member coaxially surrounding the driving member and including a radially inward extending driven tooth, and a synchronizer coaxially positioned between the driving member and the driven member.

18 Claims, 5 Drawing Sheets

SYNCHRONIZER FOR RADIALLY APPLIED DOG CLUTCH FOR A VEHICLE

FIELD

The present disclosure relates to a synchronizer for a radially applied dog clutch for a vehicle transmission.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Clutches are commonly found in automotive transmissions. Friction clutches are most common, but suffer from a number of disadvantages. Friction clutches suffer from spin losses and pump losses. Friction clutches typically require a high pressure hydraulic system to control operation of the clutch. The energy consumed by the pump(s) that provide the source for high pressure hydraulic fluid can adversely affect the efficiency of a vehicle incorporating a transmission that includes friction clutches and, thus, reduce its fuel economy.

In contrast, a dog clutch provides a selectively actuatable solid connection that does not rely upon friction. Rather, a dog clutch relies upon interference between components of the clutch. Dog clutches also do not suffer from slip. Further, a dog clutch does not require a high pressure hydraulic system to actuate. Thus, dog clutches may provide multiple advantages over a friction clutch.

Another disadvantage with a dog clutch is that they may be difficult to disconnect or disengage, especially while under load. The centrifugal force acting on the teeth resist any radially inward motion of the teeth, thereby, making disengagement sometimes unreliable.

Additionally, even when disengaged, the centrifugal force exerted on the teeth in a radially applied dog clutch cause them to move radially outward. This results in undesirable contact between these teeth and the outer driven teeth which may be a significant source of noise (ratcheting noise) and a cause for spin losses which adversely affects the overall efficiency of the system and resulting loss in fuel economy.

Further, in addition to potential ratcheting noise and spin losses, conventional radially applied dog clutches may suffer from a shock when the teeth of the driving member engage the teeth of a driven member. This shock is undesirable as it adversely effects the drivability and harshness if a passenger or driver detects or feels that shock.

SUMMARY

In an exemplary aspect, a radially applied dog clutch for a vehicle transmission includes a driving member configured to rotate about an axis and including a cavity extending radially from the axis, a driving tooth slidably movable within the radially extending cavity, a driven member coaxially surrounding the driving member and including a radially inward extending driven tooth, and a synchronizer coaxially positioned between the driving member and the driven member.

In another exemplary aspect, the synchronizer includes a substantially cylindrical wall with a window.

In another exemplary aspect, the window is adapted to receive the driving tooth.

In another exemplary aspect, the driving member further includes a plurality of radially extending cavities, the driven member includes a plurality of radially inward extending driven teeth, the synchronizer further includes a plurality of windows in the cylindrical wall, and wherein the clutch further includes a plurality of driving teeth each slidably movable within a corresponding one of the plurality radially extending cavities.

In another exemplary aspect, the synchronizer includes a radially extending flange and the driven member includes a radially extending flange having a surface opposing a surface of the synchronizer flange.

In another exemplary aspect, the clutch further includes a friction material on one of the synchronizer flange and the driven member flange.

In another exemplary aspect, the clutch further includes a biasing member that biases the synchronizer flange into contact with the driven member flange.

In another exemplary aspect, the clutch further includes comprising a retainer on the driven member and wherein the biasing member is captured between the retainer and the synchronizer flange.

In another exemplary aspect, the clutch further includes an actuator coaxially positioned within the driving member and movable along the axis to selectively engage the driving tooth sequentially with the synchronizer and the driven tooth.

In another exemplary aspect, the actuator includes an actuator shaft movable along the axis and including a swaged end, a spring retainer on the actuator shaft, a bullet actuator slidably and coaxially mounted on the actuator shaft adjacent the swaged end, and a biasing spring coaxially mounted on the actuator shaft and positioned between the bullet actuator and the spring retainer.

In this manner, the synchronizer for a radially applied dog clutch substantially eliminates or reduces the potential for an engagement shock between the teeth of a driving member and corresponding teeth of a driven member. This improves drivability and may substantially eliminate any such shock from being felt by an occupant of the vehicle.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
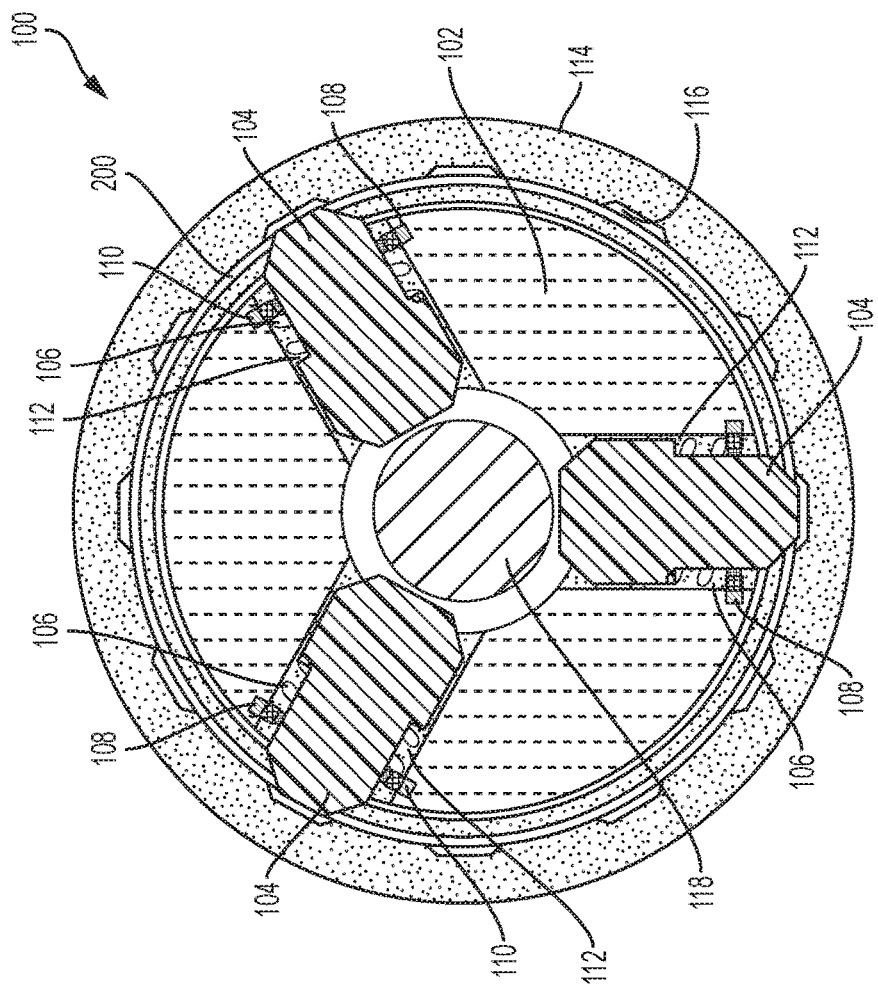
FIG. 1 is a cross-sectional view in an axial direction of an exemplary dog clutch in accordance with the present invention.

FIG. 1 is a cross-sectional view in an axial direction of an exemplary dog clutch 100 in accordance with the present invention. The dog clutch 100 includes a driving member 102 supporting radially movable teeth 104. Each tooth 104 is biased radially inwardly by a biasing member 106. In the particular embodiment illustrated by FIG. 1, the biasing members 106 are helically coiled springs which are captured between spring retainer 108, which are each positioned within a groove 110 in the driving member 102 circumferentially surrounding each corresponding tooth 104, and a landing 112 on each tooth. The dog clutch 100 further includes a driven member 114 with a plurality of radially inwardly facing driven teeth 116 and a selectively actuatable actuator 118.

Figure 2A:
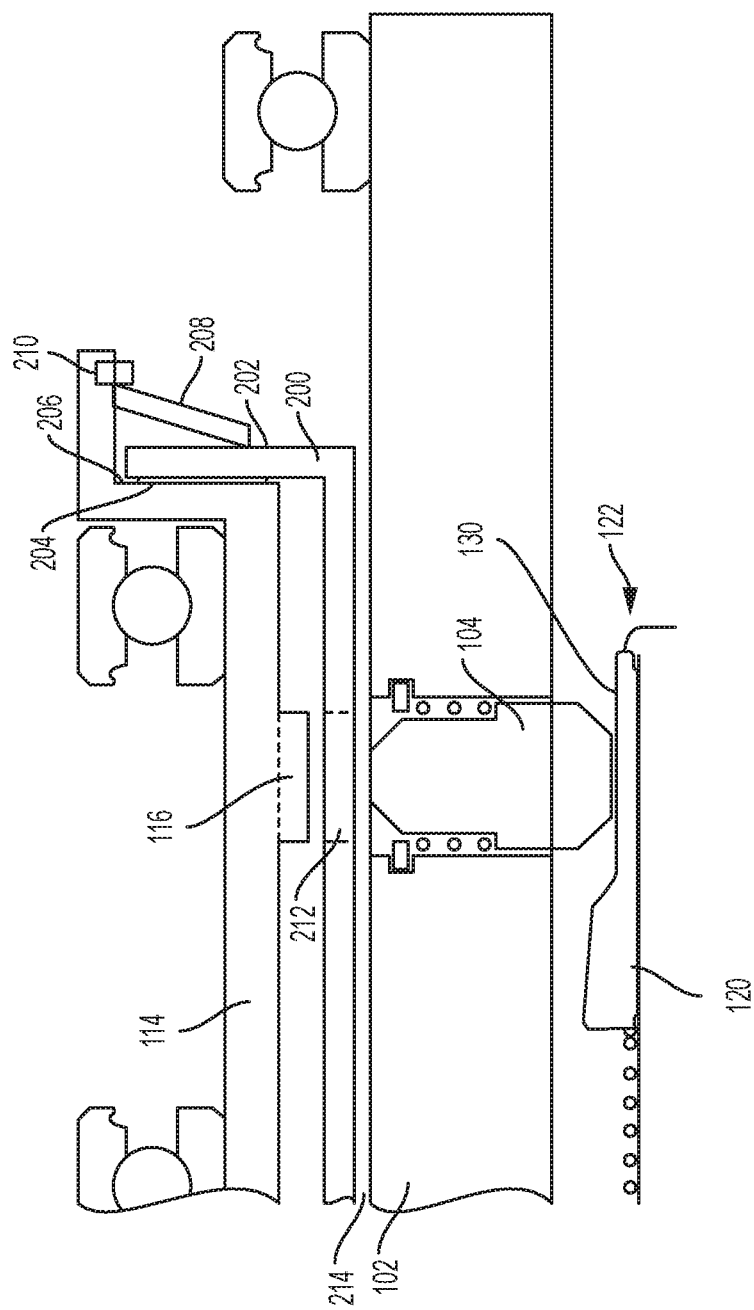
FIG. 2A is a cross-sectional view in a radial direction of a portion of the dog clutch of FIG. 1 in a disengage configuration.
Figure 2B:
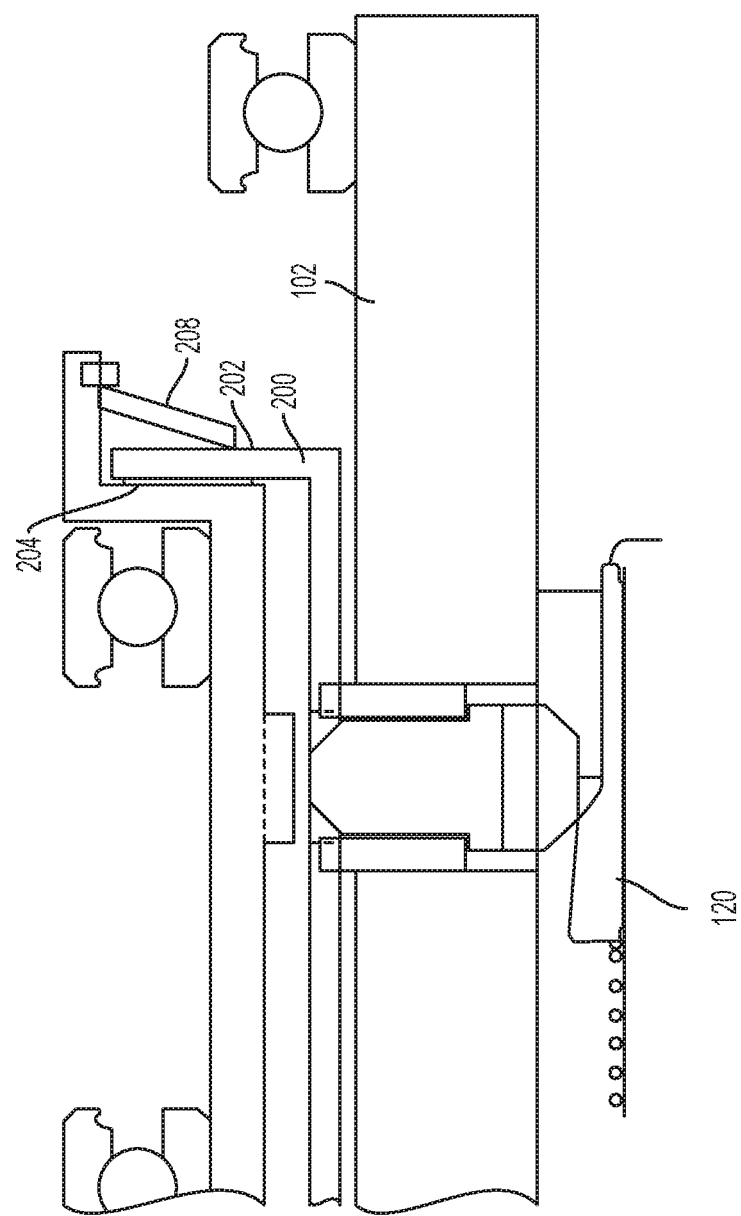
FIG. 2B is a cross-sectional view of a portion of the dog clutch of FIG. 1 in a synchronizer engage configuration.
Figure 2C:
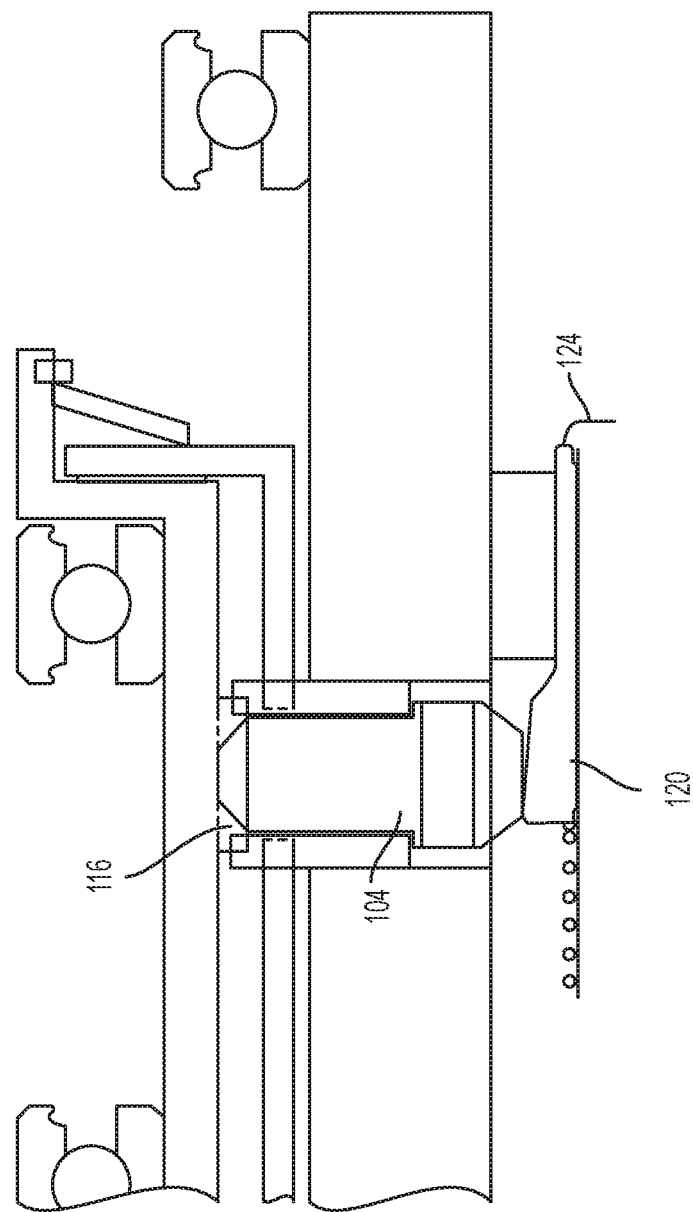
FIG. 2C is a cross-sectional view of a portion of the dog clutch of FIG. 1 in a fully engaged configuration.
Figure 3:
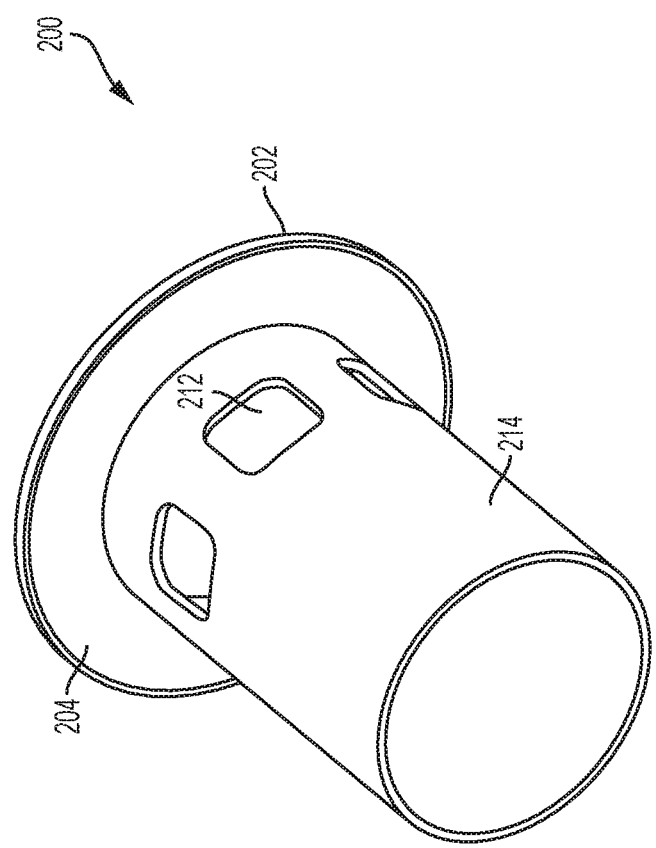
FIG. 3 is an isometric perspective view of a synchronizer for the exemplary dog clutch of FIG. 1.

Referring now to FIGS. 1 through 3, operation of the dog clutch 100 and additional detail regarding the synchronizer 200 is explained. The actuator 118 includes a bullet actuator 120 concentrically mounted on an actuating shaft 122. One end of the actuating shaft 122 includes a swage 124 which prevents the bullet actuator 120 from moving off the end of the actuating shaft 122. A biasing spring 126 is coaxially mounted on the actuating shaft 122 and is captured between the bullet actuator 120 and a retainer 128.

The synchronizer 200 is substantially cylindrical in shape and coaxially surrounds the driving member 102. The synchronizer 200 includes a radially projecting flange 202 which includes a friction material 204 applied to one surface of the flange 202 which faces a corresponding opposing surface 206 on the driven member 114. A biasing spring 208 is positioned between the synchronizer flange 202 and a retainer 210 on the driven member 114. The biasing spring 208 biases the flange 202 toward the driven member 114 such that the friction material 204 resists relative rotation between the flange 202 and the driven member 114.

Referring briefly to FIG. 3 an isometric perspective view of the synchronizer 200 is illustrated. As is clearly illustrated here, the synchronizer 200 includes a window 212 or windows extending through the cylindrical wall 214 of the synchronizer 200.

FIG. 2A illustrates a disengaged configuration where the actuating shaft 122 is positioned such that the teeth 104 are biased into contact with a disengagement landing 130 on the bullet actuator 120. In this configuration, the teeth 104 do not engage driven teeth 116 of the driven member 114 and do not extend into or engage a window 212 of the synchronizer 200. Thus, the driving member 102 may rotate freely without engaging the driven member 114 or the synchronizer 200.

To transition between the fully disengaged configuration of FIG. 2A to the fully engaged configuration of FIG. 2C, the actuating shaft 122 axially moves to the right relative to FIGS. 2A-2C, which causes the bullet actuator 120 to move to the right. As the bullet actuator 120 moves to the right, the teeth 104 slide along the camming surface of the bullet actuator 120 from the disengagement landing 130 to the engagement landing 132. This causes the teeth 104 to move radially outward against the biasing force of the biasing members 106 and to extend into a window 212 of the synchronizer 200 as is illustrated in FIG. 2B. The engagement between the teeth 104 and the window 212 causes the synchronizer 200 to immediately rotate at the same speed as the driving member 102. The synchronizer 200 is free to rotate and, therefore, offers very little resistance to a change in rotational speed. However, the driven member 114 is not yet rotating at the same speed. Therefore, there is a difference in rotational speed between the synchronizer 200 and the driven member 114. The biasing spring 204 exerts a normal force onto the flange 202 such that the friction material 204 applies a rotational torque to the driven member 114 which gradually causes the driven member 114 to rotationally accelerate until the rotational speed of the driven member 114 substantially matches that of the synchronizer 200 and thus of the driving member 102.

The actuating shaft 122 continues to axially move to the right relative to FIGS. 2A-2C, which causes the bullet actuator 120 to move further to the right. As the bullet actuator 120 moves to the right, the teeth 104 slide further along the camming surface of the bullet actuator 120 from the disengagement landing 130 to the engagement landing 132. This causes the teeth 104 to move further radially outward against the biasing force of the biasing members 106 and into contact with driven teeth 116 of the driven member 114. The driven member 114 is rotationally locked into the rotating motion of the driving member 102. Since the synchronizer 200 has previously matched the rotational speed of the driven member 114 to the rotational speed of the driving member 102 any shock which might otherwise result between the engagement of the teeth 104 and 116 is avoided.

To transition from the fully engaged configuration of FIG. 2C to the fully disengaged configuration of FIG. 2A, the actuating shaft 122 axially moves to the left (in FIGS. 2A-2C). The swage 124 pulls the bullet actuator 120 to the left which enables the teeth 104 to slide along the camming surface of the bullet actuator from the engagement landing 132 to the disengagement landing 130 which permits the biasing members 106 to positively force the teeth 104 out of engaging contact with the driven teeth 116 and out of engagement with a window 212 of the synchronizer 200. The biasing members 106 provide a significant advantage over conventional radially applied dog clutch designs because the biasing members 106 overcome the centrifugal force pulling the teeth 104 radially outward and thereby enable positive control over the disengagement of the teeth 104 from the driven teeth 116.

The engagement landing 132 optionally and preferably includes a slight slope which provides a fuse function which enables the bullet actuator 120 to slide left on the actuating shaft 122, against the biasing spring 126 to move the teeth 104 from contact with the engagement landing 132 to the disengagement landing 130 when the dog clutch 100 is overloaded. In the absence of an overload condition, the biasing spring 126 biases the bullet actuator 120 against the swage 124 which serves to prevent the teeth 104 from sliding down (camming down) from the engagement landing 132 to the disengagement landing 130.

While the above description and accompanying descriptions included descriptions of a radially inwardly biasing member for the teeth 104 and of an actuator 120 with a spring that enables ratcheting of the actuator 120, it is understood that the synchronizer of the present invention may be used with any radially applied dog clutch.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A radially applied dog clutch for a vehicle transmission, the clutch comprising:
   a driving member configured to rotate about an axis and including a cavity extending radially from the axis;
   a driving tooth slidably movable within the cavity extending radially from the axis;
   a driven member coaxially surrounding the driving member and including a radially inward extending driven tooth;
   a synchronizer coaxially positioned between the driving member and the driven member; and
   an actuator coaxially positioned within the driving member and movable along the axis to selectively engage the driving tooth sequentially with the synchronizer and the driven tooth.

2. The clutch of claim 1, wherein the synchronizer comprises a substantially cylindrical wall with a window.

3. The clutch of claim 2, wherein the window is adapted to receive the driving tooth.

4. The clutch of claim 2, wherein the cavity extending radially from the axis comprises a plurality of cavities extending radially from the axis, the radially inward extending driven tooth comprises a plurality of radially inward extending driven teeth, and the synchronizer further comprises a plurality of windows in the cylindrical wall, and wherein the clutch further comprises a plurality of driving teeth each slidably movable within a corresponding one of the plurality of cavities extending radially from the axis.

5. The clutch of claim 1, wherein the synchronizer comprises a radially extending flange and the driven member includes a radially extending flange having a surface opposing a surface of the synchronizer flange.

6. The clutch of claim 5, further comprising a friction material on one of the synchronizer flange and the driven member flange.

7. The clutch of claim 5, further comprising a biasing member that biases the synchronizer flange into contact with the driven member flange.

8. The clutch of claim 5, further comprising a retainer on the driven member and wherein the biasing member is captured between the retainer and the synchronizer flange.

9. The clutch of claim 1, wherein the actuator comprises:
   an actuator shaft movable along the axis and including a swaged end;
   a spring retainer on the actuator shaft;
   a bullet actuator slidably and coaxially mounted on the actuator shaft adjacent the swaged end; and
   a biasing spring coaxially mounted on the actuator shaft and positioned between the bullet actuator and the spring retainer.

10. A vehicle transmission comprising:
    a driving member configured to rotate about an axis and including a cavity extending radially from the axis;
    a driving tooth slidably movable within the cavity extending radially from the axis;
    a driven member coaxially surrounding the driving member and including a radially inward extending driven tooth;
    a synchronizer coaxially positioned between the driving member and the driven member; and
    an actuator coaxially positioned within the driving member and movable along the axis to selectively engage the driving tooth sequentially with the synchronizer and the driven tooth.

11. The transmission of claim 10, wherein the synchronizer comprises a substantially cylindrical wall with a window.

12. The transmission of claim 11, wherein the window is adapted to receive the driving tooth.

13. The transmission of claim 11, wherein the cavity extending radially from the axis comprises a plurality of cavities extending radially from the axis, the radially inward extending driven tooth comprises a plurality of radially inward extending driven teeth, and the synchronizer further comprises a plurality of windows in the cylindrical wall, and wherein the clutch further comprises a plurality of driving teeth each slidably movable within a corresponding one of the plurality of cavities extending radially from the axis.

14. The transmission of claim 10, wherein the synchronizer comprises a radially extending flange and the driven member includes a radially extending flange having a surface opposing a surface of the synchronizer flange.

15. The transmission of claim 14, further comprising a friction material on one of the synchronizer flange and the driven member flange.

16. The transmission of claim 14, further comprising a biasing member biasing the synchronizer flange into contact with the driven member flange.

17. The transmission of claim 14, further comprising a retainer on the driven member and wherein the biasing member is captured between the retainer and the synchronizer flange.

18. The transmission of claim 10, wherein the actuator comprises:
    an actuator shaft movable along the axis and including a swaged end;
    a spring retainer on the actuator shaft;
    a bullet actuator slidably and coaxially mounted on the actuator shaft adjacent the swaged end; and
    a biasing spring coaxially mounted on the actuator shaft and positioned between the bullet actuator and the spring retainer.

* * * * *